United States Patent [19]

Dufresne

[11] 4,241,521
[45] Dec. 30, 1980

[54] MULTI-SYMBOL MESSAGE COMMUNICATOR FOR A SPEECHLESS, HANDICAPPED PERSON

[76] Inventor: Armand F. Dufresne, 901 Iva Ct., Cambria, Calif. 93428

[21] Appl. No.: 722,676

[22] Filed: Sep. 13, 1976

[51] Int. Cl.³ .............................................. G09B 21/00
[52] U.S. Cl. .................................. 434/112; 340/147 R
[58] Field of Search ................... 35/6, 8 R, 9 R, 9 A, 35/35 R, 35 A, 35 C; 40/52 R, 130 L, 132 D; 340/147 R, 324 M, 325, 337, 339, 365 E; 364/200

[56] References Cited

U.S. PATENT DOCUMENTS

| | | | |
|---|---|---|---|
| 3,241,115 | 3/1966 | Maling | 340/147 R |
| 3,504,200 | 3/1970 | Avellar | 340/365 E |
| 3,623,157 | 11/1971 | Stapleford | 35/9 A X |
| 3,651,512 | 3/1972 | Summers | 340/325 |
| 3,686,641 | 8/1972 | Logan et al. | 364/200 |
| 3,725,680 | 4/1973 | Silva | 340/365 E X |
| 3,750,138 | 7/1973 | Burgan et al. | 340/339 X |
| 3,781,802 | 12/1973 | Kafafian | 340/147 R |
| 3,793,471 | 2/1974 | Mason et al. | 35/35 A |
| 3,878,513 | 4/1975 | Werner | 364/200 |
| 3,894,346 | 7/1975 | Ward | 35/6 X |
| 3,932,859 | 1/1976 | Kyriakides et al. | 35/35 R |
| 4,005,316 | 1/1977 | Tomlinson | 340/365 E |
| 4,024,534 | 5/1977 | Du Vall | 340/365 E X |
| 4,044,475 | 8/1977 | Fujisawa | 35/6 |

Primary Examiner—Vance Y. Hum
Attorney, Agent, or Firm—Christie, Parker & Hale

[57] ABSTRACT

Apparatus is provided for facilitating communication of a multi-symbol message by a speechless, handicapped person. The apparatus includes a plurality of independently selectable symbol indicators, preferably arranged in a matrix, and each including an electrically energizable light source such as a light emitting diode that is energized when the symbol is selected. As an aid to message composition, an individually selected one of the symbol indicators serves as a cursor. The apparatus receives signals supplied by an actuator accessory for defining commands including a cursor-move command and a record command. Upon completion of message composition, the apparatus provides for automatically selecting each symbol indicator that had served as the cursor at the time of receipt of a record command.

7 Claims, 8 Drawing Figures

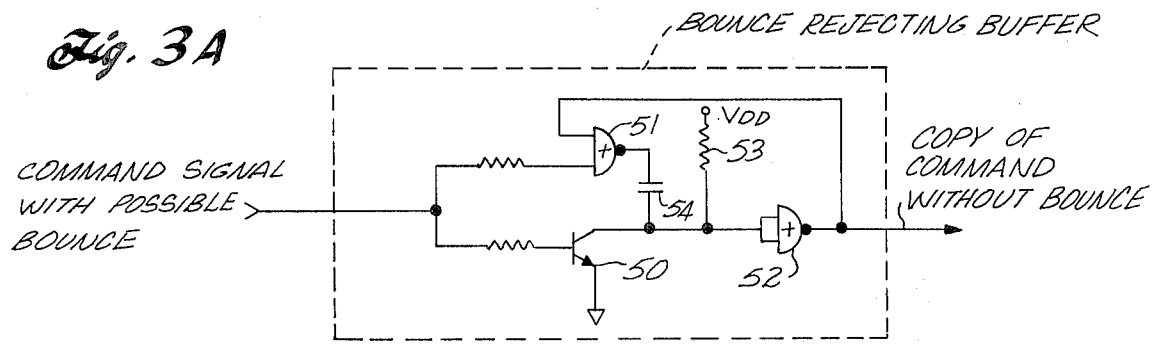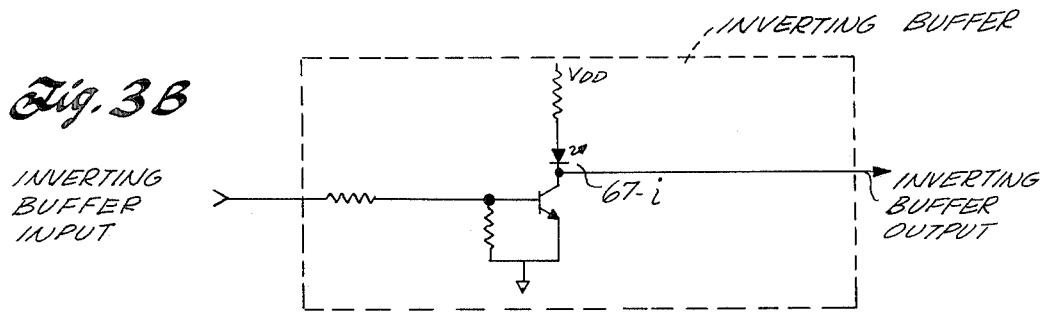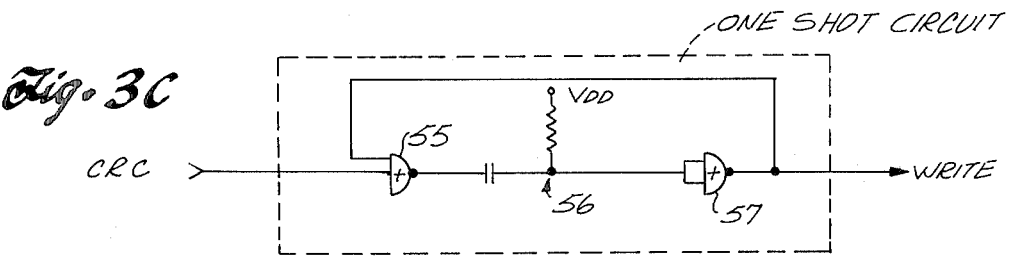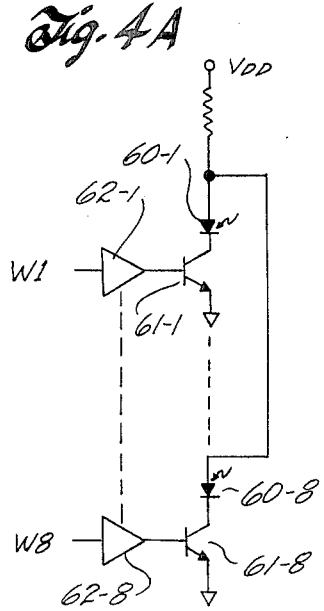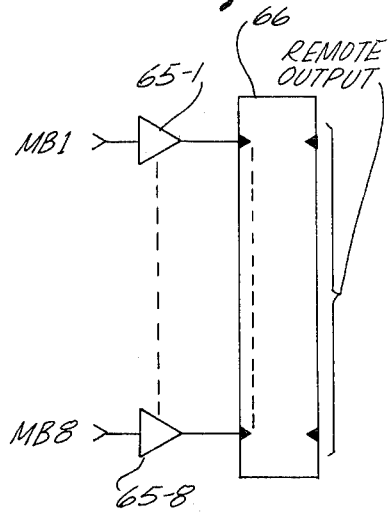

MULTI-SYMBOL MESSAGE COMMUNICATOR FOR A SPEECHLESS, HANDICAPPED PERSON

BACKGROUND OF THE INVENTION

This invention relates to apparatus for facilitating communication of a multi-symbol message by a speechless, handicapped person.

A person who is both speechless and handicapped with cerebral palsy, muscular sclerosis, or a similarly serious motor problem often cannot employ writing or sign language as a means of expression. Moreover, a machine such as a conventional typewriter is far too difficult to operate for such a person.

A youngster who is so afflicted is under a severe difficulty as a student. In an effort to alleviate this difficulty there has heretofore been developed a communication device called a matrix communicator.

In one known matrix communicator, there is provided a case having a window and means for accepting and holding an interchangeable symbol sheet so that the symbol sheet placed therein can be viewed through the window. Various symbol sheets can be provided so that an appropriate symbol repertory can be defined to meet a particular occasion. Each symbol sheet includes a matrix of symbol areas having thereon numbers, letters, words or other symbols such as Blissymbols. For an article treating the subject of Blissymbols, see "Semantography-Blissymbolics", by C. K. Bliss, published in 1965 by Semantography-Blissymbolic Publications, Sydney, Australia.

In the above-mentioned case there is provided, firstly, for each symbol in the matrix, a corresponding electrically energizable light source, namely, a light emitting diode (LED); and, secondly, electronic circuitry for controlling the energization of the light sources on a one at a time basis in accordance with command defining signals supplied by an accessory actuator. Various types of accessory actuators are available, the simplest of which have hand-operated push button switches that can be depressed to cause the supplied signals to define the commands. Other types of accessory actuators can be operated in response to movement of the person's foot, or his head, or even his tongue. Also, instead of separate push buttons, the accessory actuator can provide a joystick.

In response to one type of command, referred to herein as a "go up" command, a row address register in the electronic circuitry is updated and switching circuitry responds by turning off whichever LED was on and by turning on instead the LED in the same column but in the row immediately above. As a result of such an operation, it appears to a viewer that the light has moved from one symbol to another. Similar commands, namely, "go down", "go right", and "go left", likewise provide for movement of the light in the specified direction from one symbol to another.

Although the above-described matrix communicator provides significant advantages, it suffers from an important drawback. In particular, it can select (i.e., illuminate) only one symbol at a time, and only change from one symbol in a message to the next at the rate with which the handicapped person can control the actuator. As a practical matter, the person such as a teacher to whom the message is being communicated must watch the symbol sheet throughout the composition of the message. Moreover, he must concentrate intensely so that he can remember the sequence of the symbols in the message. In this connection, it should be borne in mind that, as the light moves, symbols are illuminated which are not part of the message. It is only the symbols where the handicapped person brings the light to a stop that are the selected symbols in the message.

Owing to the need for such continuous watching, a significant problem is posed in a classroom situation in which the teacher is working with several students at the same time.

SUMMARY OF THE INVENTION

This invention is directed to an improved arrangement for facilitating communication of a multi-symbol message by a speechless, handicapped person. Significantly, the improved arrangement eliminates the above-described drawback of a known matrix communicator whereby continuous attention must be paid while a multi-symbol message is being composed.

Viewed from one aspect, the invention provides apparatus comprising a symbol repertory which includes a plurality of symbol indicators that are independently selectable so that an individually selected one of them can instantaneously indicate a present cursor position in the course of message composition. Significantly, a collectively selected plurality of the symbol indicators can respectively indicate symbols of the multi-symbol message. Each symbol indicator includes an electrically energizable light source that is energized when the symbol indicator is selected.

The apparatus further includes register means for storing a cursor position signal. Controllable switching means are provided for selectively energizing the light sources. Means are provided for receiving command-defining signals for defining a plurality of types of commands including a cursor-move command and a record command. Circuit means respond to each received cursor-move command to update the cursor position signal so that it keeps track of the present cursor position. Gating circuit means are provided which respond to the cursor position signal by controlling the controllable switching means to cause the individual selection of a single symbol indicator to indicate present cursor position. The apparatus further includes control circuit means for automatically controlling the controllable switching means to cause the collective selection of each symbol indicator that had been indicating present cursor position at the time of receipt of a record command. Owing to the feature whereby symbols are automatically collectively selected, the handicapped person can privately compose a multi-symbol message at his own pace and later the full message can be communicated when convenient.

Viewed from another aspect, the invention provides an improvement in a matrix communicator for a speechless, handicapped person, the matrix communicator having display means which defines a symbol repertory and which responds to a matrix address by indicating a symbol selected from the symbol repertory. The matrix communicator further has register means which stores the matrix address and which responds to command-defining signals to update the matrix address as the handicapped person composes a multi-symbol message. The improvement comprises means for receiving command-defining signals for defining a plurality of types of commands including a record command and a playback command. There is provided a first-in, first-out memory means. The first-in, first-out memory means includes means responsive to sequentially received record commands for compiling a list of matrix addresses. Each matrix address in the list is the matrix address stored in the register means at the time of receipt of a respective one of the sequence or record commands. The first-in, first-out memory means further includes timing means responsive to a received playback command for causing the list of matrix addresses to be provided to the display means one-by-one in the same order in which they were compiled so that each of a plurality of symbols forming a message are thereby indicated.

The foregoing and various preferred features of the invention are described in detail hereinafter and are incorporated in the appended claims.

BRIEF DESCRIPTION OF THE DRAWINGS

FIG. 3 comprises FIGS. 3A–3C, which show in more detail those functional elements of the preferred embodiment provided to receive command-defining signals;

FIG. 4 comprises FIGS. 4A and 4B which are block and schematic diagrams showing additional functional elements that are preferably included in an embodiment of this invention.

DETAILED DESCRIPTION

Figure 5:
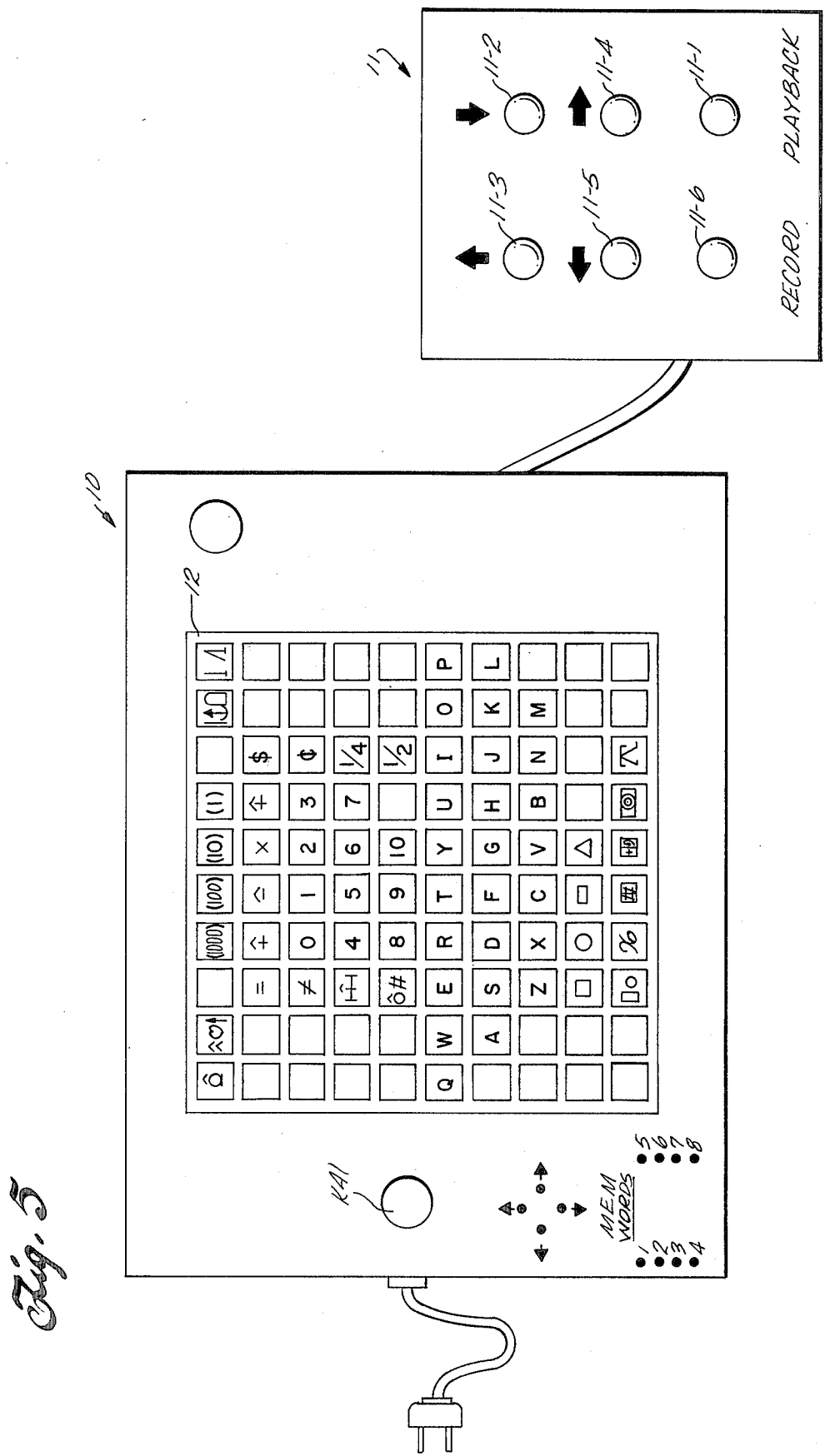
FIG. 5 is a top plan view of a suitable matrix communicator in which the invention can be embodied together with an accessory actuator therefor.

In accordance with the preferred embodiment of this invention, there is provided, as shown in FIG. 5, a matrix communicator case 10 and an actuator accessory 11. A suitably sized case has a 17"×13" top surface and is 2" deep. The top has a removable window to provide a transparent protective cover for interchangeable symbol sheets such as representative symbol sheet 12 that are placed in the case. Each symbol sheet has a matrix, preferably of 10 rows and 10 columns, of symbol areas. Representative symbol sheet 12 is intended for math and spelling drills and has all the letters of the alphabet arranged in the same manner as letters are arranged in the keyboard of a standard typewriter. As indicated by the blank spaces, representative symbol sheet 12, like some others, does not have a symbol in every symbol area. Still other symbol sheets, not shown, have a symbol in each of the 100 symbol areas. The symbols can be letters, numbers, and even phrases that express a complete thought.

Hidden beneath the symbol sheet 12, there is a matrix of electrically energizable light sources for selectively illuminating the symbol areas.

Preferably, a multi-conductor cable interconnects case 10 and actuator accessory 11. Being flexible, the cable enables actuator accessory 11 to be moved relative to case 10 to a convenient place. A power cord is provided together with a terminating plug to provide for coupling household operating power to electronic circuitry within case 10.

Figure 2:
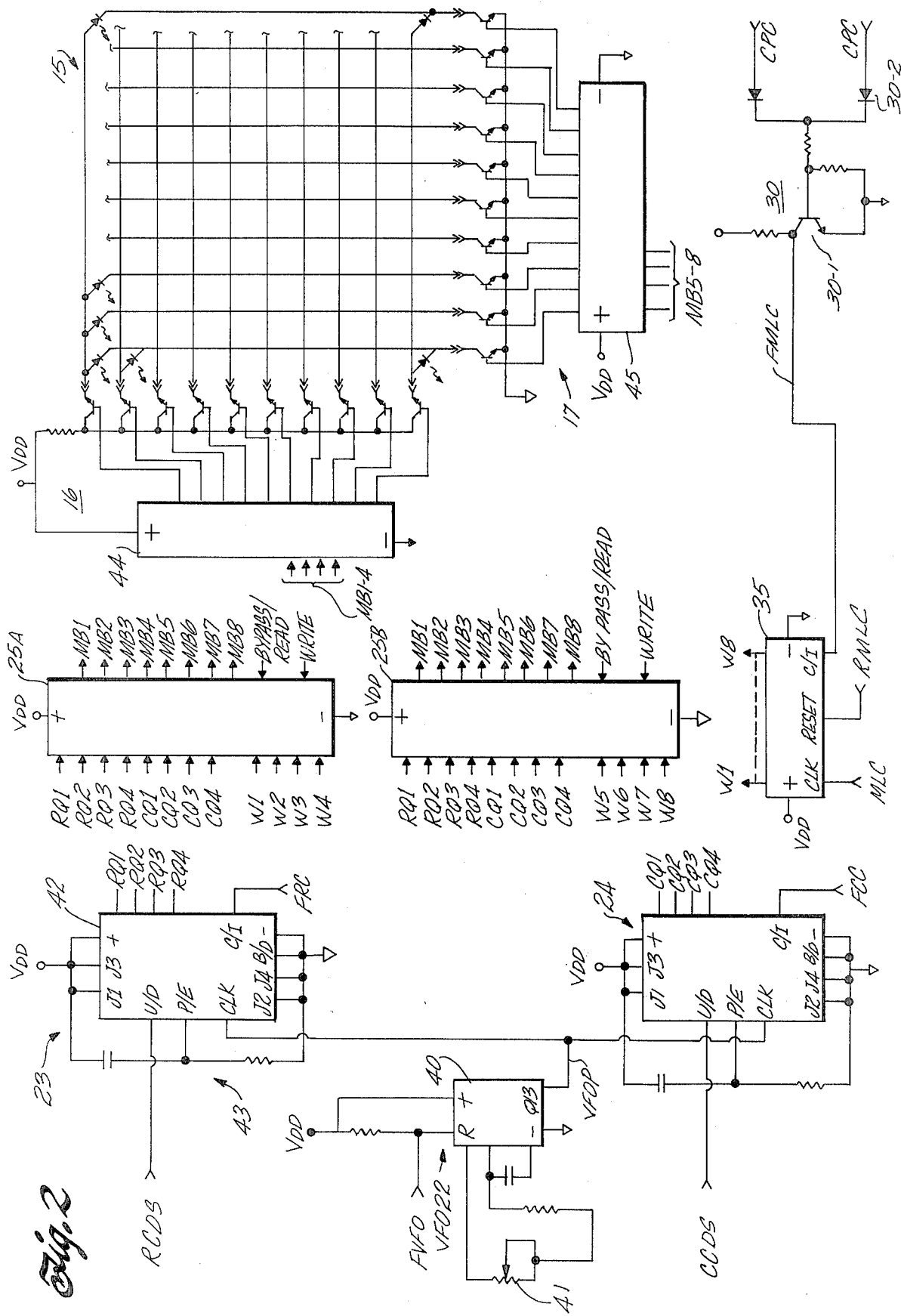
FIG. 2 is a block and schematic diagram showing in more detail some of the functional elements of the preferred embodiment.

At the left side of the top surface, there is a knob K41 for adjusting a speed control potentiometer discussed below with reference to FIG. 2. In the area of the lower left corner of the top surface, there are a plurality of status display lights discussed more fully below. Near the upper right corner, there is provided an ON/OFF push-button latching switch.

Figure 1:
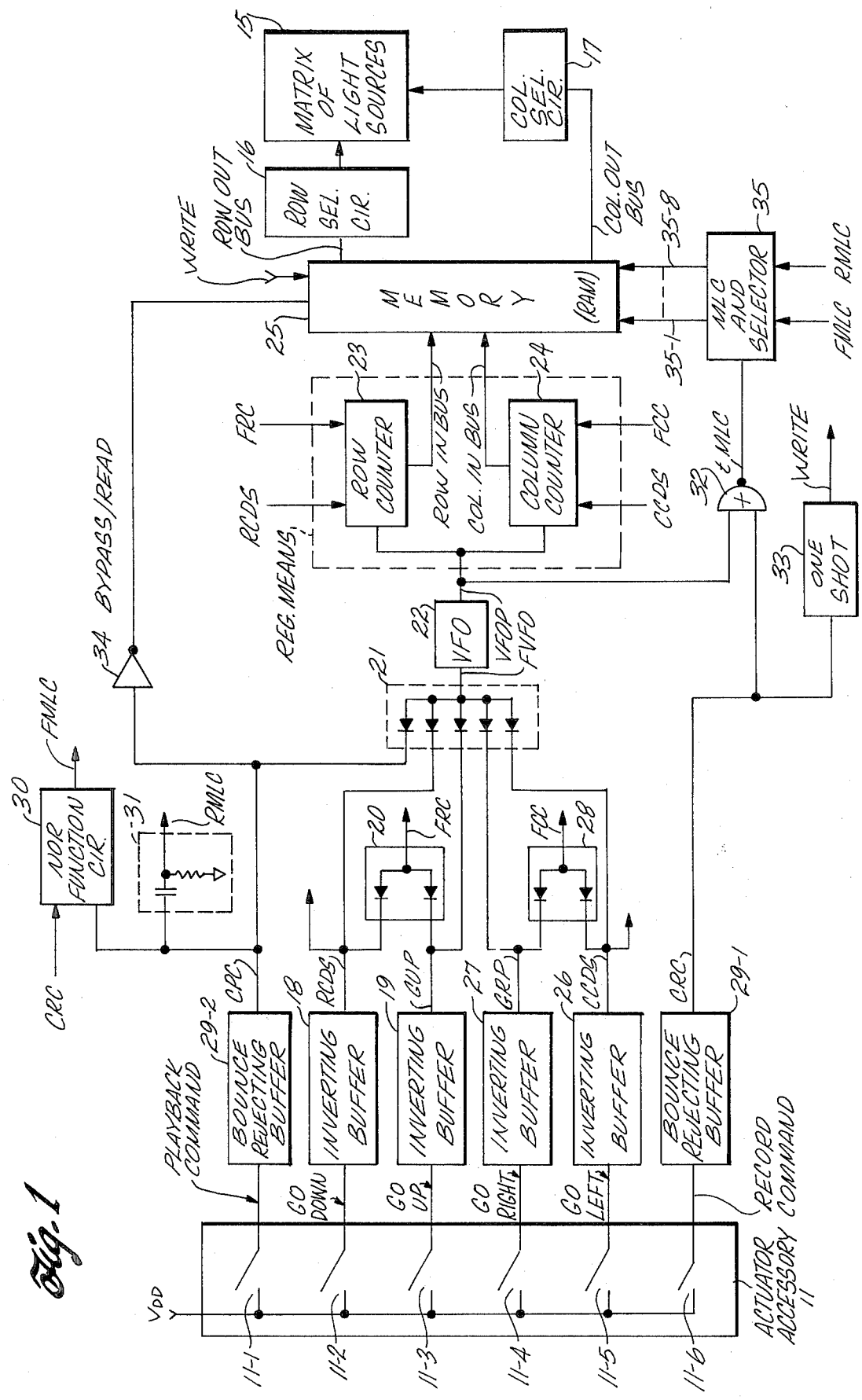
FIG. 1 is a block and schematic diagram showing the general arrangement of the principal functional elements of the preferred embodiment of this invention.

With reference to FIG. 1, there will now be given a general explanation of the principal functional elements of electronic circuitry contained in case 10 for controlling the energization of the light sources in accordance with command-defining signals received from actuator accessory 11. The matrix of light sources 15 is connected to controllable switching means comprising a row selection circuit 16 and a column selection circuit 17. With a symbol sheet in place, matrix 15 together with selection circuits 16 and 17 provide a display means which defines a symbol repertory and which responds to a matrix address by indicating a symbol selected from the repertory. The symbol repertory may be considered as including a plurality of independently selectable symbol indicators with each symbol indicator including an electrically energizable light source that is energized when the symbol indicator is selected.

As an aid to message composition, it is preferable to have an individually selected one of the symbol indicators instantaneously indicate a present cursor position. The cursor is moved from one symbol indicator to another in response to a cursor-move command defined by a multi-bit command-defining signal received from actuator assembly 11. The cursor-move command-defining signal used in the preferred embodiment is a 4-bit digital signal encoded to specify the direction in which the cursor is commanded to move. The four component signals making up these four bits are referred to herein as the go down, go up, go right, and go left command signals.

An inverting buffer 18 receives the go down command signal and produces an RCDS (an acronym for "Row Counter Direction Select") control signal. When a push-button switch 11-2 in actuator assembly 11 is manually closed, the go down command signal equals logical 1, thereby defining a go down command; otherwise, the go down command signal equals 0. Owing to the logical inversion provided by inverting buffer 18, the RCDS control signal equals logical 0 while the go down command is being given. An inverting buffer 19 receives the go up command signal and produces a GUP (an acronym for "Go Up Prime") control signal. When a push-button switch 11-3 in actuator assembly 11 is manually closed, the go up command signal equals logical 1, thereby defining a go up command; otherwise, the go up command signal equals 0. Owing to the logical inversion provided by inverting buffer 19, the GUP control signal equals logical 0 while the go up command is being given. A gating circuit 20 receives the RCDS and GUP control signals and produces an FRC (an acronym for "Freeze Row Counter") control signal. The FRC control signal equals 0 whenever either of the RCDS or GUP control signals equals 0.

A gating circuit 21 also receives the RCDS and GUP control signals, together with other control signals described below, and produces an FVFO (an acronym for "Freeze Variable Frequency Oscillator") control signal. The FVFO control signal equals 0 whenever any of the control signals it receives equals 0.

A variable frequency oscillator (VFO) 22 receives the FVFO control signal and produces a VFOP signal. When the FVFO control signal equals 1, VFO 22 does not oscillate and the VFOP signal equals 0. When the FVFO control signal equals 0, the VFOP signal defines a train of pulses at a pulse repetition frequency within an adjustable range between approximately 0.25 pps and 3 pps.

A row counter 23 receives the VFOP, RCDS, and FRC control signals. Row counter 23 is a conventional up/down counter. When the FRC control signal equals 1, row counter 23 does not respond to the other control signals it receives. When the FRC control signal equals 0, row counter 23 will, in response to each pulse of the VFOP signal, either count up or count down depending upon the logical level of the RCDS control signal.

Row counter 23 applies a first binary coded decimal (BCD) signal to a row in bus. This first BCD signal defines the row portion of a matrix address. A column counter 24 applies a second BCD signal to a column in bus. This second BCD signal defines the column portion of the matrix address. In combination, row counter 23 and column counter 24 define a register means for storing a cursor position signal (i.e., the matrix address).

An integrated circuit (IC) random access memory (RAM) 25 receives a bypass/read control signal. When the bypass/read control signal equals 1, RAM 25 operates as a multi-signal transmission gate with the result that the row in bus is effectively connected to a row out bus, and the column in bus is effectively connected to a column out bus. During the time that the handicapped person is composing a message, the bypass/read signal equals 1. Accordingly, the cursor position signal or matrix address is gated partly to row selector circuit 16 and partly to column selector circuit 17. In response, the display means indicates an individually selected one of the symbol indicators as a cursor.

Consider now briefly the response to a down command. The handicapped person closes push button switch 11-2 to move the cursor downwardly and keeps it closed until the cursor has moved to the row he desires. By way of example, the starting position for the cursor may be in the tenth row (i.e., the top row) and the desired end position for the cursor may be in the first row (i.e., the bottom row). The row address of the tenth row is decimal 9 or 1001 in BCD. The row address of the first row is decimal 0 or 0000 in BCD.

As soon as push button switch 11-2 is closed the go down command signal becomes equal to 1. Inverting buffer 18 responds to this by causing the RCDS control signal to become equal to 0. Gating circuit 20 responds to this by causing the FRC control signal to become equal to 0, and gating circuit 21 responds by causing the FVFO control signal to become equal to 0. With the RCDS and FRC control signals being equal to 0, row counter 23 is in condition to count down in response to each pulse it receives from VFO 22. With the FVFO control signal being equal to 0, VFO 22 oscillates and pulses are defined in the VFOP control signal supplied to row counter 23. By holding push-button switch 11-2 closed for a time long enough for VFO 22 to produce nine pulses in the VFOP control signal, row counter 23 is decremented or counted down from row address decimal 9 to row address decimal 0. As row counter 23 steps in this down counting process, the cursor moves from the top row to the bottom row.

Substantially the same kind of operation is involved in moving the cursor upwardly. To do this, the handicapped person closes push-button switch 11-3 in actuator accessory 11, and keeps it closed until the cursor has moves up to the desired row. With push-button switch 11-3 closed, the go up command signal equals 1, the GUP control signal equals 0, and the FRC and FVFO control signals each equals 0. Under these circumstances, row counter 23 is in condition to be incremented or count up.

Corresponding operations are involved in moving the cursor to the left or to the right from column to column along the same row. To move the cursor to the left, the handicapped person closes push button switch 11-5, thereby causing the go left command signal to become equal to 1. An inverting buffer 26 responsive thereto causes a CCDS (an acronym for "Column Counter Direction Select") control signal to become equal to 0. To move the cursor to the right, the handicapped person closes push button switch 11-4, thereby causing the go right command signal to become equal to 1. An inverting buffer 27 responsive thereto causes a GRP (an acronym for "Go Right Prime") control signal to become equal to 0. A gating circuit 28 receives the CCDS and GRP control signals and produces an FCC (an acronym for "Freeze Column Counter") control signal that exercises control over column counter 24 in the same manner that the FRC control signal exercises control over row counter 23. Gating circuit 21 responds to the CCDS and GRP control signals in the same manner that it responds to the RCDS and GLP control signals. That is, whenever either of these control signals equal 0, the FVFO control signal equals 0, whereby VFO 22 is permitted to oscillate and produce pulses in its output VFOP control signal.

It will be appreciated from the foregoing that the functional elements described above including gating circuits 20, 21 and 28 provide a gating circuit means, responsive to each cursor-move command received by inverting buffers 18, 19, 26, and 27, for updating the cursor position signal stored in the register means comprising row counter 23 and column counter 24, whereby the cursor position signal or matrix address keeps track of the present cursor position. It will also be appreciated that RAM 25, while operating in its bypass mode, provides a gating means for coupling the cursor position signal to row selection and column selection circuits 16 and 17. The latter circuits provide a controllable switching means for selectively energizing the light sources, and, while RAM 25 operates in its bypass mode, there is effected an individual selection of a single symbol indicator to indicate present cursor position.

As has been described above, a known matrix communicator likewise has the capability of individually selecting a symbol indicator on a one-at-a-time basis in accordance with directional command signals such as those involved in giving the move-cursor command. Such limited capability has been a drawback. Consider now the functional elements of the preferred embodiment which overcome this drawback.

A bounce rejecting buffer circuit 29-1 receives a record command signal and produces a CRC (an acronym for "Copy of Record Command") control signal. When a push-button switch 11-6 is actuator assembly 11 is manually closed, the record command signal equals logical 1, thereby defining a record command; otherwise, the record command signal equals 0.

A bounce rejecting buffer circuit 29-2 receives a playback command signal and process a CPC (an acronym for "Copy of Playback Command") control signal. When a push-button switch 11-1 in actuator accessory 11 is manually closed, the playback command signal equals logical 1, thereby defining a playback command; otherwise, the playback command signal equals 0.

A NOR function circuit 30 receives the CRC and CPC control signals and produces an FMLC (an acronym for "Freeze Memory Location Counter") control signal. A conventional differentiating circuit 31 also receives the CPC control signal and produces an RMLC (an acronym for "Reset Memory Location Counter") control signal. A two input NOR gate 32 receives the CRC and VFOP control signals and produces a tMLC (an acronym for "trigger Memory Location Counter") control signal. A one-shot circuit 33 receives the CRC control signal and produces a WRITE control signal. The CPC control signal is also applied to an inverter 34 which produces the bypass/read control signal described above.

A memory location counter (MLC) and selector 35 receives the tMLC, FMLC, and RMLC control signals. Eight signal leads 35-1 through 35-8 (not all shown in FIG. 1) connect MLC 35 to RAM 25 and respectively carry W1 through W8 control signals.

Consider now briefly the response to a record command. After the cursor has been moved to a position where it indicates a symbol that the handicapped person has decided to include in a message being composed, he closes push-button switch 11-6. This causes the record command signal to become equal to 1. In response, NOR function circuit 30 causes the FMLC control signal to become equal to 0, NOR gate 32 causes the tMLC control signal to become equal to 0, and one-shot circuit 33 causes a write pulse to appear in the WRITE control signal.

The WRITE control signal is applied to RAM 25 and the leading edge of the write pulse causes the contents of the row and column counters to be written into a selected one of eight memory locations of RAM 25. The selection of the memory location is determined by MLC 35. As to the first symbol in a multi-symbol message, MLC 35 is, as described below, in a reset condition at the time the handicapped person closes push-button switch 11-6. In this condition, the W1 control signal equals 1, and each of the W2 through W8 control signals equals zero. This addresses the first of the eight memory locations and accordingly the then present cursor position signal or matrix address is entered in RAM 25 in the first memory location. When the handicapped person releases push button switch 11-6, the record command signal returns to 0. In response, the tMLC control signal returns to 1. The positive-going edge so defined triggers MLC 35 so that it counts up by 1. After this counting operation, the W2 control signal equals 1 and each of the other control signals produced by MLC 35 equals 0.

While a multi-symbol message is being composed, a plurality of matrix addresses are written into RAM 25 in the manner described above, whereby there is compiled a list of matrix addresses, each matrix address in the list being the matrix address stored in the cursor position register means at the time of receipt of a respective one of the sequence of record commands.

At an arbitrarily convenient time after the message has been fully composed, the handicapped person closes push-button switch 11-1 so as to give the playback command. In response, bounce rejecting buffer circuit 29-2 causes the CPC control signal to change from 0 to 1. Differentiating circuit 31 responds to the positive-going edge so defined by resetting MLC 35 so that it addresses the first memory location. NOR function circuit 30 responds by causing the FMLC signal to become equal to 0, thereby enabling MLC 35 to respond to trigger pulses by counting up. Inverter 34 responds by causing the bypass/read signal to become equal to 0, thereby placing RAM 25 in its readout mode of operation. The first memory location which is read out is the first memory location which had been written into during the composition of the message. Owing to this readout operation, a matrix address is provided to the display means to cause it to indicate the first symbol of the message.

The ensuing symbols in the multi-symbol message are indicated in the same order in which they were composed. This is so because the matrix addresses stored in RAM 25 are read out one by one in a first-in, first-out order, i.e., in the same order in which they were entered in the list of matrix addresses. To this end, MLC 35 scans RAM 25 by counting upwardly in response to the timing pulses of the tMLC control signal. These timing pulses are generated by VFO 22, which operates in its oscillating mode during the playback sequence.

Preferably, complementary-symmetry, metal-oxide semiconductor (C-MOS) IC's are employed in accordance with the invention. Suitable IC's from which some of the functional elements of the embodiment of FIG. 1 can be constructed are shown in the block and schematic diagram of FIG. 2. In FIG. 2, many of the signal leads for interconnecting the IC's are not shown; to show them all would obscure the important features with a mass of detail. Instead, various output and input signals are labeled, and it is to be understood that all points having a common label are interconnected. One such label, $V_{DD}$, refers to the positive voltage of a battery (not shown) for providing operating power to the IC's. Preferably, the battery is rechargeable and a conventional battery charger circuit is provided for rectifying household electrical power and supplying charging current to the battery.

Each of the IC's referred to below by part number are sold by RCA, Solid State Division, of RCA Corporation, among others. VFO 22 includes an IC chip 40, namely a CD4060AE chip, which is a 14-stage ripple-carry binary counter/divider and oscillator. Chip 40 has a reset terminal (R), DC power terminals (+ and −), a Q13 output terminal, and three terminals for connection to an external frequency determnining network. In VFO 22, the frequency determining network includes a speed control potentiometer 41.

Row counter 23 includes an IC chip 42, namely a CD4029AE chip, which is presettable up/down counter. Chip 42 has four terminals (J1-J4), which are commonly referred to as a jam input and which are used in connection with a presetting or initializing operation. Further in this connection, chip 42 has a preset enable terminal (P/E). When a positive voltage (i.e., logical 1) is applied to the P/E terminal, the internal counting stages of chip 42 are preset in accordance with the logical level of the signals applied to the jam input. In row counter 23, a conventional differentiating circuit 43 is provided for supplying a positive pulse to the P/E terminal when DC operating power is turned on. Owing to the connection of the J1 and J3 terminals to $V_{DD}$ and of the J2 and J4 terminals to ground, chip 42 is preset or initialized at a count of decimal 5. Chip 42 has a B/D terminal which is grounded in row counter 23 so that chip 42 counts as a BCD-decade counter rather than as a binary counter. Chip 42 has a clock inhibit (CI) input terminal which receives the FRC control signal. While the FRC control signal equals 1, the internal counting stages of chip 42 remain in the same state notwithstanding the receipt of counting pulses on the clock (CLK) input terminal of chip 42. Chip 42 has four output terminals which provide the following four signals: RQ1, RQ2, RQ3, and RQ4. These four signals define a row address portion of a matrix address, and are carried by the row in bus (FIG. 1) to RAM 25.

Column counter 24 has the same construction as row counter 23. It provides the following four signals: CQ1, CQ2, CQ3, and CQ4. These four signals define a column address portion of a matrix address and are carried by the column in bus (FIG. 1) to RAM 25.

Two IC chips 25A and 25B are connected together to form RAM 25. Each of these two chips is a CD4039AD chip, which is a 4-word by 8-bit random access nondestructive readout memory. Chip 25A provides the first four memory locations of RAM 25 and chip 25B provides the remaining four memory locations thereof.

MLC 35 is a CD4022AE IC chip, which is a divide-by-eight counter/divider with eight decoded outputs. The first four of the eight outputs, namely W1-W4, are applied to chip 25A, and the remaining four, namely W5-W8, are applied to chip 25B. As has been explained above, only one at a time of these eight control signals equals 1 and the remaining seven equal 0. If, for example, the first memory location of RAM 25 is being addressed, W1 equals 1, and the first memory location can either be written into or can be read out. When effecting such readout, the bypass/read command signal equals zero, and the contents of the first memory location is applied to the row and column readout buses (FIG. 1). In FIG. 2, the signals which are carried by the readout bus are labeled MB1 through MB8. Of these, MB1-MB4 define a row address portion of a matrix address, and MB5-MB8 define the column address portion thereof.

Row selection circuit 16 includes an IC chip 44, namely, a CD4028AE chip, which is a BCD-to-decimal decoder. The ten outputs of chip 44 are respectively connected to the base electrodes of ten NPN switching transistors.

Column selection circuit 17 includes an IC chip 45 which is also a CD4028AE chip. The ten outputs of chip 45 are respectively connected to the base electrodes of ten NPN switching transistors.

The above-mentioned switching transistors provide the energization current for energizing the light emitting diodes which are arranged to define the ten row by ten column matrix 15.

With the foregoing details in mind, consider now the initial conditions of the circuits when DC power is turned on. Row counter 23 and column counter 24 are preset such that the initially stored matrix address is the sixth row, sixth column. At this point, the bypass/read signal equals 1, and accordingly, both chips 25A and 25B operate as multi-signal transmission gates. Thus, the four signals MB1-MB4 equal the four signals RQ1-RQ4 (i.e., 0101), and the four signals MB5-MB8 equal the four signals CQ1-CQ4 (i.e., 0101). MLC 35 can be initialized in a manner described below so that its 1 output equals 1 as an initial condition from which to begin message composition.

Under these intial conditions, decoder chip 44 turns on the switching transistor in the sixth row (measured from the bottom row) and decoder chip 45 turns on the switching transistor in the sixth column (measured from the leftmost row). The LED at the intersection of the sixth row and sixth column is therefore energized and illuminates a symbol in the sixth row and sixth column of the symbol sheet (FIG. 5). Of course, simply because the symbol is illuminated at this point does not mean that it has been chosen to be part of a message. To the contrary, its significance is that it indicates a cursor position.

Consider now an example of operation in which the handicapped person wants to use representative symbol sheet 12 (FIG. 5) to indicate the word "NO". With representative symbol sheet 12 in place, the symbol "10", being in the sixth row and sixth column, is indicated as the initial cursor. To move the cursor to indicate the letter "N", the cursor position must be moved to the third row, eighth column, which is two columns to the right and three rows below the initial cursor position. The handicapped person can give a go right command by closing push-button switch 11-4 and holding it closed long enough for two pulses to be provided by VFO 22 so as to increment column counter 24 until its CQ1-CQ4 outputs define the BCD number 0111. Then the handicapped person can give a go down command by closing push-button switch 11-2 and holding it closed long enough for three pulses to be provided by VFO 22 so as to decrement row counter 23 until its RQ1-RQ4 outputs define the BCD number 0010.

After the handicapped person has done that, and the letter N is indicated as the cursor, the handicapped person then gives the record command by closing push-button switch 11-6. In response, bounce rejecting buffer 29-1 causes the CRC control signal to become equal to 1. A transistor 30-1 (FIG. 2) in NOR function circuit 30 receives base current when the CRC control signal forward biases a diode 30-2, and is thereby turned on so that the FMLC signal, defined at the collector electrode of transistor 30-1, becomes equal to 0. With the FMLC control signal now equal to 0, MLC 35 is no longer inhibited from counting, and the next timing pulse in the tMLC control signal will cause MLC 35 to increment. After being so incremented, its W2 output equals 1.

The trigger pulse for incrementing MLC 35 is not produced until the end of the record command. (This is so because NOR gate 32, which produces the tMLC control signal, has the effect of inverting the CRC control signal.) The write pulse for causing a matrix address to be written into RAM 25, however, is produced at the beginning of the record command. (This is so because one shot circuit 33, which produces the WRITE control signal, is triggered by the positive-going or leading edge of the CRC control signal.)

In short, the first record command causes the matrix address of the symbol N to be written into the first location of RAM 25 as the first entered matrix address of the list. And, MLC 35 is incremented to address the second location of RAM 25 in preparation for the second entry. After effecting the first entry, the handicapped person repositions the cursor to the fifth row, ninth column, so as to cause the symbol O to indicate the cursor position. This can be done by closing push-button switch 11-4 long enough for VFO 22 to provide one pulse to column counter 24, and then closing push-button switch 11-3 long enough for VFO 22 to provide two pulses to row counter 23. Column counter 24 will be incremented as a result of the go right command so as to store BCD 1000. Row counter 23 on the other hand will be incremented as a result of the go up command so as to store BCD 0100. A second record command can then be given to cause this matrix address to be written into the second memory location of RAM 25.

When the handicapped person desires to do so, he can give the playback command by closing push-button switch 11-1.

Consider now FIG. 3A which shows a suitable arrangement of a bounce rejecting buffer circuit. A command signal with possible bounce (either the record command signal or the playback command signal) is resistively coupled to the base electrode of a transistor switch 50 and to the first input of a two input NOR gate 51. While no command is being given, the command signal equals 0. Accordingly, transistor switch 50 is off and its collector potential is approximately equal to the positive battery voltage $V_{DD}$. NOR gate 52 responds to this by providing a 0 output. NOR gate 51, receiving zero-level signals on its two inputs, provides a one-output. Thus capacitor 54 is uncharged.

At the point in time at which a command is given, the command signal changes from 0 to 1. This causes transistor switch 50 to turn on and simultaneously causes NOR gate 51 to provide a 0 output. Thus, the voltages at both opposite ends of capacitor 54 change from approximately $V_{DD}$ to approximately 0 volts. With the voltage at the collector electrode of transistor switch 50 being 0 volts, NOR gate 52 produces a logical 1 level output. In the event that the command signal bounces (i.e., momentarily returns to 0), transistor switch 50 will follow the bounce and turn off. However, NOR gate 52 will not follow the bounce. This is so because of a time delay involved in charging capacitor 54 to the threshold voltage of NOR gate 52.

FIG. 3B shows a suitable arrangement of an inverting buffer circuit which involves a well-known common emitter switching amplifier circuit arrangement.

FIG. 3C shows a suitable arrangement of one shot circuit 33 which responds to the CRC control signal to produce the WRITE control signal. The CRC control signal is applied to the first input of a two-input NOR gate 55. The output of NOR gate 55 is coupled through a differentiating circuit 56 to an input of an inverting stage 57. The output on inverting stage of 57 is fed back to the second input of NOR gate 55. Under conditions of operation during which the CRC control signal equals 0, NOR gate 55 produces a 1 level output, and inverting stage 57 produces a 0 level output. When the CRC control signal changes from 0 to 1, the output of NOR gate 55 changes from 1 to 0 thereby causing differentiating circuit 56 to provide a negative going pulse to inverting stage 57. In response, inverting stage 57 produces the positive going write pulse in the WRITE control signal.

Consider now FIG. 4A. Preferably, there are provided eight LED's 60-1 through 60-8 (not all shown in FIG. 4A) for providing a memory status indication. The current for energizing these eight LED's is provided by eight transistor switches, 61-1 through 61-8. The W1 through W8 outputs of MLC 35 are coupled by means of buffers 62-1 through 62-8 to control these eight transistor switches. Preferably, two identical IC's, each being a CD4050AE type, are used for this buffering. This type of IC is a hexbuffer having six independent inverter stages (not all of which are used).

It will be recalled that in a situation in which the first location of RAM 25 is being addressed, the W1 signal equals 1, whereas the W2 through W8 signals each equal 0. In this situation, buffer 62-1 causes transistor switch 61-1 to energize LED 60-1.

The memory status indication provided by these eight LED's is an aid to message composition. First of all, when power is first turned on, MLC 35 may initially go to any one of its eight possible states. If desired, the handicapped person can cause MLC 35 to go to its reset state before he begins to compose a message. To do this, he gives a playback command by closing push-button switch 11-1 and releasing it as soon as LED 60-1 lights up, thereby indicating that MLC 35 is in its reset state (i.e., W1 equals 1).

The eight LED's 60-1 through 60-8 can be seen in FIG. 5 in the area of the lower left corner of the top surface of case 10. Four other LED's, arranged in a diamond pattern, can be seen above LED's 60-1 through 60-8. A representative one of these four LED's is LED 67-i, shown in FIG. 3B. It will be recalled that four identically constructed inverting buffers 18, 19, 26, and 27 are provided for respectively receiving the component signals of the multi-bit move-cursor command. Considering inverting buffer 18 as representative, the common-emitter switching amplifier therein energizes the corresponding one of the four LED's while the go down command is being given. In short, these four LED's provide a command status indication as to the direction, if any, in which the cursor is being commanded to move.

The command status indication is most useful when a certain type of actuator accessory (referred to herein as a reversing type) is used. A reversing type actuator is used for example when the handicapped person is physically unable to operate four different switches for providing the four different direction command signals. As stated above, certain actuator accessories include a foot switch or a tongue-actuated switch or a head-movement controlled switch. The reversing feature is provided so that such a single manually actuable switch can be used to give any one of the four direction commands. To do this, a cyclical counter is stepped each time the single switch is closed. A decoder responsive to the counter provides the four direction command signals (i.e., go down, go up, go right, and go left).

In using such a reversing type actuator, the handicapped person repeatedly opens and closes the single switch until the desired direction command is given. By observing the LED's defining the command status indication, he will know when he has done this. He will continue to keep up the single switch closed long enough for VFO22 to provide the pulses used to update the register means. Of course, by observing the symbol sheet, he will know when he has done this. Then, he opens the single switch so that the cursor will remain at the symbol he has chosen.

As to the memory status indication defined by LED's 60-1 through 60-8, this is an aid to editing a message. In particular, if the handicapped person desires to change a symbol in a multi-symbol message, he can do so. In composing a message, an error may have been made with respect to the third of the sequence of symbols for example. To correct the error, the handicapped person can give a playback command for a time long enough for MLC 35 to count to the point at which W3 equals 1. The handicapped person will know this has been done because at that point LED 60-3 will light up. He can then reposition the cursor to the desired symbol and then give a record command. This will result in overwriting of the contents of the third memory location of RAM 25, and will not affect any other memory location of RAM 25.

Consider now FIG. 4B which is directed to an optional, but preferred feature, whereby remote output buffer circuitry is provided. In accordance with this feature, each of the signals MB1 through MB8 is buffered by a respective one of a plurality of buffer stages 65-1 through 65-8 to provide matrix addresses as an input to a remote device. The individual buffer stages are suitably provided by two of the CD4050AE type IC chip. It is contemplated that an external utilization device such as an appropriately adapted electric typewriter or remote display can be connected via output connector 66 to receive the buffered memory addresses.

It will be appreciated that the foregoing description of the preferred embodiment sets forth the best, but not the only, mode of carrying out this invention. It should be clear that the spatial arrangement of the symbol indicators into a square matrix is preferred, but other spatial arrangements are within the scope of the invention. Similarly, more or fewer symbol indicators can be provided with only minor modifications. The same is true with respect to the number of memory locations within the random access memory. Indeed, at the sacrifice of one of the advantageous features of the invention with respect to the time sequential displaying of symbols of the message, an alternative arrangement can be provided for collectively displaying the message symbols concurrently. In such alternative arrangement there are provided a pair of electrically energizable light sources for each symbol in the symbol repertory. As to each such pair, one of the light sources provides for indicating cursor position, whereas the other one of the pair is controlled by a bistable circuit such as a latch circuit. In such alternative embodiment, the response to a record command includes the setting of whichever light circuit is associated with the symbol indicator then serving as the cursor.

What is claimed is:

1. In a matrix communicator for a speechless, handicapped person, the matrix communicator having display means which defines a symbol repertory and which responds to a matrix address by indicating a symbol selected from the symbol repertory, and having register means which stores the matrix address and which responds to command-defining signals to update the matrix address as the handicapped person composes a multi-symbol message, an improvement comprising:
   means for receiving command-defining signals for defining a plurality of types of commands including a record command and a playback command;
   first-in, first-out memory means;
   the first-in, first-out memory means including means responsive to sequentially received record commands for compiling a list of matrix addresses, each matrix address in the list being the matrix address stored in the register means at the time of receipt of a respective one of the sequence of record commands;
   the first-in, first-out memory means further including timing means responsive to a received playback command for causing the list of matrix addresses to be provided to the display means one-by-one in the same order in which they were compiled so that each of a plurality of symbols forming a message are thereby indicated.

2. An improvement according to claim 1 wherein the first-in, first-out memory means comprises a plurality of addressable locations each for storing a separate one of the list of matrix addresses, a memory location counter, and means for providing timing pulses to the memory location counter for scanning the locations as the list of matrix addresses is provided to the display means.

3. An improvement according to claim 1 and further comprising means for providing a bypass control signal, and wherein the first-in, first-out memory means is responsive to said bypass control signal to gate the matrix address stored in the register means to the display means to provide for indicating a cursor position while a message is being composed.

4. An improvement according to claim 1 and further comprising remote-output buffer circuitry for providing a digital signal output coded to identify the plurality of symbols indicated in response to the playback command.

5. An improvement according to claim 1 and further comprising memory status indicating means for indicating the number of matrix addresses that have been compiled in the list.

6. In a matrix communicator for a speechless, handicapped person, the matrix communicator having display means which defines a symbol repertory and which responds to a matrix address by indicating a symbol selected from the symbol repertory, and having register means which stores the matrix address and which responds to command-defining signals to update the matrix address as the handicapped person composes a multi-symbol message, an improvement comprising:
   means for receiving command-defining signals for defining a plurality of types of commands including a record command and a playback command;
   first-in, first-out memory means including a plurality of addressable locations, a memory location counter, writing means, and reading means;
   said writing means including counter control means responsive to sequentially received record commands for sequentially causing the memory location counter to address the memory locations one-by-one, and memory control means responsive to said sequentially received record commands for compiling a list of matrix addresses in the addressed locations, each matrix address in the list being the matrix address stored in the register means at the time of receipt of a respective one of the sequence of record commands; and
   said reading means further including timing means responsive to a received playback command for causing the list of matrix addresses to be provided to the display means one-by-one in the same order in which they were compiled so that each of a plurality of symbols forming a message are thereby indicated.

7. An improvement according to claim 6 and further comprising memory status indicating means for indicating the number of matrix addresses that have been compiled in the list.

* * * * *